United States Patent [19]

Dickson, Jr.

[11] Patent Number: 4,568,437

[45] Date of Patent: Feb. 4, 1986

[54] METHOD AND APPARATUS FOR FORMING DISILANE

[75] Inventor: Charles R. Dickson, Jr., Pennington Borough, N.J.

[73] Assignee: RCA Corporation, Princeton, N.J.

[21] Appl. No.: 687,465

[22] Filed: Dec. 28, 1984

[51] Int. Cl.[4] .......................... C07G 13/00; H01L 45/00
[52] U.S. Cl. ..................................... 204/164; 204/165;
427/39; 422/186.21; 315/111.21
[58] Field of Search .................. 204/164, 165; 427/39;
219/121 P, 121 PL; 422/186.21; 315/111.21

[56] References Cited

U.S. PATENT DOCUMENTS

| | | | |
|---|---|---|---|
| 3,280,018 | 10/1966 | Denis | 204/164 |
| 4,064,521 | 12/1977 | Carlson | 357/2 |
| 4,066,527 | 1/1978 | Takagi | 427/39 |
| 4,289,797 | 9/1981 | Akselrad | 427/39 |
| 4,362,632 | 12/1982 | Jacob | 422/183.04 |
| 4,450,185 | 5/1984 | Shimizu et al. | 427/39 |
| 4,483,883 | 11/1984 | Nath | 427/39 |

OTHER PUBLICATIONS

Spanier et al., Journal of Inorganic Chemistry 1, 432, (1962).
Gorkale et al., Journal of Inorganic Nuclear Chemistry 27, 1911, (1965).
B. Chapman, *Glow Discharge Processes*, John Wiley & Sons, (New York, 1980), pp. 13–19.
P. A. Longeway et al., J. Physical Chemistry 88, 73–77, (1984).
G. Turban et al., Thin Solid Films 77, 287–300, (1981).
Kirk–Othmer, *Encyclopedia of Chemical Technology*, John Wiley & Sons, (New York, 1967), pp. 421–427.

*Primary Examiner*—John F. Niebling
*Attorney, Agent, or Firm*—Birgit E. Morris; Donald S. Cohen; William J. Burke

[57] ABSTRACT

A method for forming disilane comprises flowing monosilane gas into a reaction vessel while maintaining a glow discharge in the monosilane and flowing the reaction product comprising the disilane out of the reaction vessel at a rate such that the monosilane gas resonance time in the reaction vessel is less than about one second. An apparatus for forming disilane comprises a source of flowing monosilane, a reaction vessel and electrical means for maintaining a glow discharge in the flowing monosilane in the reaction vessel.

14 Claims, 2 Drawing Figures

METHOD AND APPARATUS FOR FORMING DISILANE

The invention relates to a highly efficient method and apparatus for forming disilane from monosilane in a glow discharge.

BACKGROUND OF THE INVENTION

Carlson in U.S. Pat. No. 4,064,521, incorporated herein by reference, has disclosed amorphous silicon devices wherein the semiconductor materials are deposited from a glow discharge in a monosilane gas. These devices are useful in high-efficiency photodetectors, thin film transistors and electrophotography.

Experimental studies have shown that a high-quality amorphous silicon semiconductor layer can be deposited at a high deposition rate from a glow discharge in disilane. However, commercially available disilane is more expensive than monosilane and may be contaminated with impurities such as chlorosilanes, siloxanes and alkyl hydrocarbons from the manufacturing process. Disilane has been produced in low yields by the chemical reaction of metal silicides with inorganic acids, the reaction of hexachlorodisilane with lithium aluminum hydrides and by silent discharge methods from monosilane. The silent-discharge method, as exemplified by Spanier et al. in the Journal of Inorganic Chemistry 1, 432 (1962) and Gorkale et al. in the Journal of Inorganic Nuclear Chemistry 27, 1911 (1965), comprises passing monosilane gas through an electrical discharge in an ozonizer. The ozonizer comprises a chamber having a pair of closely spaced electrodes with a dielectric therebetween. A silent discharge between the electrodes induces a diffuse high pressure glow on the surface of the dielectric which is often described as a brush discharge and which stimulates the conversion reaction of a simple hydride to a complex hydride. The silent discharge is distinguished from the low pressure glow discharge used by Carlson to deposit an amorphous semiconductor layer in that the gas pressure in the ozonizer is much greater than about 0.1 atmosphere and the inter-electrode spacing is much smaller. Correspondingly, a low pressure glow discharge cannot be sustained in an ozonizer because of the small inter-electrode spacing. The ozonizer produces disilane from monosilane with a low efficiency, typically less than several percent per passage through the ozonizer, thus requiring the use of low-temperature traps to separate the higher silanes and a multi-pass system for recirculating the remainder of the monosilane through the ozonizer until a useful concentration of the disilane is obtained.

Disilane has also been observed in diagnostic studies of the glow discharge in monosilane used for the deposition of amorphous silicon according to the process disclosed by Carlson. In these studies the concentration of disilane in the discharge was found to be less than about five percent.

It would thus be clearly desirable to have a high-efficiency means for producing comparatively pure disilane in order to improve the process for the deposition of an amorphous silicon layer therefrom.

SUMMARY OF THE INVENTION

The invention includes a method for forming disilane from monosilane which comprises flowing the monosilane into a reaction vessel at a rate such that the monosilane gas residence time in the vessel is less than one second, maintaining a glow discharge in the flowing monosilane in the vessel and flowing the reaction product including the disilane from the vessel.

The invention also includes apparatus for forming disilane from monosilane comprising a reaction vessel, means for controlling the monosilane gas flow such that the monosilane gas residence time in the vessel is less than one second, electrical means for generating the glow discharge in the vessel and output means for flowing the reaction product comprising the disilane out of the vessel.

DETAILED DESCRIPTION OF PREFERRED EMBODIMENTS

The method of the invention comprises flowing monosilane from a source into a reaction vessel at a rate such that the monosilane gas residence time in the vessel is less than one second, maintaining a glow discharge in the monosilane gas in the vessel and flowing the reaction product including disilane out of the reaction vessel. Using this method a concentration of up to forty percent of disilane in the reaction product have been observed.

Figure 1:
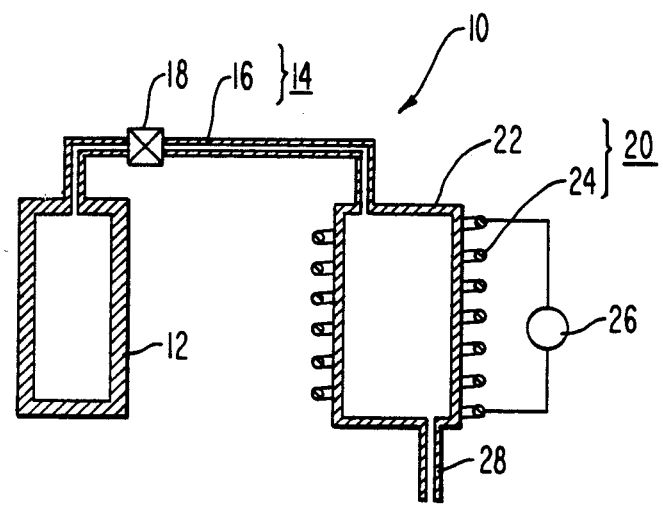
FIG. 1 is a cross-sectional illustration of an apparatus of the invention for producing disilane.

In FIG. 1 apparatus 10 for forming disilane from monosilane includes a source 12 of monosilane, gas flow connecting means 14, comprising a tube 16 with a flow control means 18, for connecting the source 12 to a reaction vessel 20. The reaction vessel 20 comprises a reaction chamber 22 and electrode means 24, shown here as a coil axially disposed about the chamber 22. Electrical power means 26, such as an rf power supply, are connected to the electrode means 24. The electrode means 24 and the electrical power means 26 comprise electrical means for maintaining a glow discharge in the chamber 22. The apparatus 10 also includes vessel output means 28 for flowing the reaction products including the disilane from the reaction chamber 22 into an auxiliary vessel, not shown, such as a storage tank or a layer deposition chamber.

Figure 2:
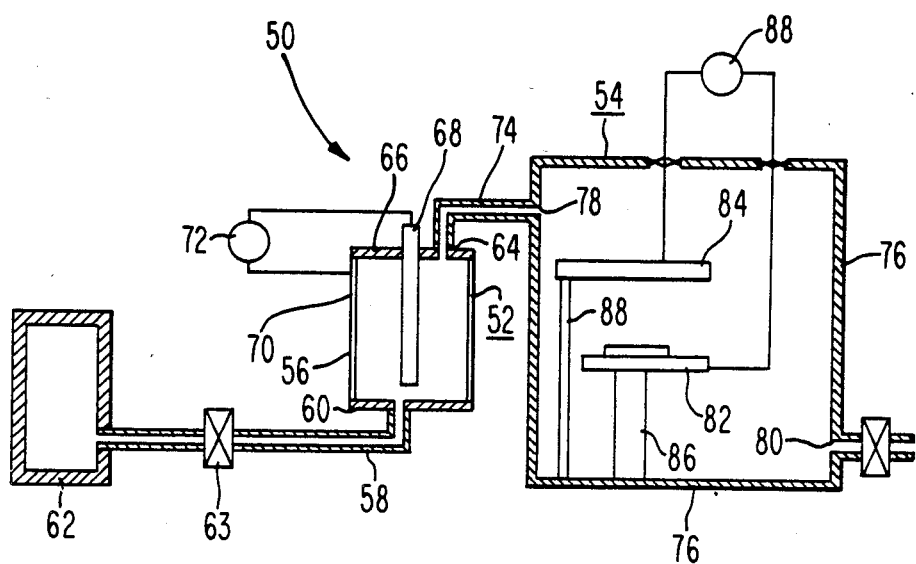
FIG. 2 is a cross-sectional illustration of an apparatus of the invention for forming disilane and depositing a semiconductor layer therefrom.

In FIG. 2 an inline apparatus 50 for depositing a layer of semiconductor material from disilane includes a reaction vessel 52 and a deposition chamber 54. The reaction vessel 52 includes a reaction chamber 56 having an input means 58 in a first end wall 60 connected to a monosilane gas source 62 through a flow control means 63 and output means 64 in a second end wall 66 for flowing the reaction products produced out of the vessel 52. Electrical means for initiating and maintaining a glow discharge in the reaction chamber 56 comprise a first electrode 68 extending through the second end wall 66 into the chamber 56, a second electrode 70 extending between the end walls 60 and 66, and axially disposed about the first electrode 68 and forming a side wall of the reaction chamber 56, and electrical power means 72, such as a dc or rf power supply, connected between the first and second electrodes 68 and 70. Connecting means 74 provides a gas flow path for the reaction products from the output means 62 to the deposition chamber 54.

The deposition chamber 54 includes walls 76 having an entrance port 78 and exit port 80 extending therethrough and first and second deposition electrodes 82 and 84, respectively, mounted in a spaced apart arrangement on supports 86 and 88, respectively. Electrical power means 88 are connected between the deposition electrodes 82 and 84 and are sufficient to initiate and maintain a glow discharge between the electrodes 82 and 84 in the presence of the reaction products created in reaction vessel 52. The combination of the electrodes 82 and 84 and the power means 88 comprise the deposition electrical means.

The reaction chambers 22 and 56 are airtight containers capable of operating with a low internal pressure, typically less than 5 torr. The reaction chamber 22 has a dielectric wall, typically of quartz, so that electrical energy can be coupled from the external coil 24 into the container to maintain a glow discharge in the low pressure atmosphere therein. In the reaction chamber 56 the second electrode 70 serves as the side wall. Alternatively the side wall can be composed of an electrically insulating material with the second electrode 70 positioned inside this wall.

A reaction vessel constructed according to the invention included a first electrode, the anode, which was a 0.8 centimeter (cm) diameter stainless steel rod and a second electrode, the cathode, which was a 3.8 cm inside diameter stainless steel tube. The gas-containing volume of the vessel was 0.2 liters. The first electrode was welded to the metal portion of a Kovar glass to metal steel mounted on a standard flange plate. The second electrode was electrically grounded. Heat was supplied to the vessel by use of a heating tape wrapped around the second electrode with the vessel temperature monitored using a chromel-alumel thermocouple. During operation monosilane gas entered the vessel at the bottom as illustrated in FIG. 2 and the reaction products exited the vessel at the top. Maximum production of disilane was observed under the following range of operating conditions for the vessel: DC current between 75 and 150 milliamperes, DC voltage to the electrodes between 650 and 900 volts, gas pressure between 1 and 2 torr, reaction vessel temperature between 150° and 250° C. and monosilane gas flow between 75 and 150 standard cubic centimeters per minute (sccm), the flow rate corrected to standard pressure and temperature. The output reaction products, analyzed using a differentially pumped quadrupole mass spectrometer, were found to be hydrogen, disilane, trisilane and unreacted monosilane. For a reaction vessel operating with a monosilane gas input pressure of 1 torr and a 50 sccm flow rate, a DC electrical input power of 100 watts and a vessel temperature of 200° C., a conversion efficiency of 40 percent by weight from monosilane to disilane was observed. Based upon these results, I estimate that the cost of the materials to produce disilane using the apparatus and the method of the invention is between about 20 and 30 times less than the present cost of commercially available disilane.

I have found that the output of disilane with a monosilane input depends upon the electrical power input to the discharge, the total gas pressure and the flow rate of the monosilane. In general, the amount of disilane produced is increased by increasing the total gas pressure or the applied power and by decreasing the flow rate. However, a point is reached at which higher pressure, higher input power and lower flow rate produce a lower concentration of disilane in the reaction product. The end result is that, with variation of these parameters in the directions indicated, disilane production increases to a maximum and then gradually decreases.

The critical parameter for this process is the input gas residence time in the reaction vessel. The residence time t as defined, for example, by Chapman, *Glow Discharge Processes*, J. Wiley & Sons (New York 1980) pp 14–17, is:

$$t = (79 \text{ sccm/torr-liter/sec}) \cdot P \cdot V / F$$

where P is the gas pressure (torr) in the vessel, V is the volume (liters) of the vessel and F is the monosilane input flow rate in sccm. The range of gas residence times for the efficient production of disilane from monosilane is less than about 1 second, typically between about 0.05 and 0.50 seconds and preferably between about 0.1 and 0.3 seconds. The optimum conditions for depositing an amorphous silicon layer having good electrical quality from a glow discharge in monosilane are different from the optimum conditions for producing disilane. The typical gas residence time in a system for depositing an amorphous silicon layer is about 40 seconds.

The temperature of the gas in the reaction vessel is typically between room temperature and 400° C. and preferably between about 120° C. and 300° C. At a temperature less than about 120° C. a large amount of polymeric silicon powder is formed in the vessel.

To test the quality of an amorphous silicon semiconductor layer deposited from a glow discharge in the reaction products formed using the method of the invention a one micrometer ($\mu$m) thick intrinsic-conductivity-type layer of hydrogenated amorphous silicon was deposited onto a stainless steel substrate held at a temperature of about 300° C. To obtain a total partial pressure of both monosilane and disilane of about 0.5 torr, the total pressure in the deposition chamber was increased to about 1.7 torr with the balance of the pressure due to hydrogen generated in the reaction vessel. The minority carrier diffusion length of the deposited film at one sun illumination was measured, using the surface photovoltage measurement technique, to be 0.3 $\mu$m, indicating that the deposited layer was of good electrical quality.

A reaction vessel of the invention may also be used with a collection station to amass a large amount of disilane. A U-tube trapping sequence including a liquid nitrogen trap followed by two n-pentane/liquid nitrogen traps ($-135°$ C.) is used with all products except molecular hydrogen being trapped by the liquid nitrogen. After about 15 minutes the reaction vessel is turned off and the liquid nitrogen trap is removed. Both disilane and trisilane are trapped by the n-pentane traps and the monosilane is pumped away. If the monosilane pressure is above about 220 torr, it will condense, but upon pumping it will be removed. When the pressure remains at less than 1 torr after valving off the pump, all of the silane has been removed. If the trisilane is to be removed from the disilane, then a repeat distillation is required using liquid nitrogen/methanol traps ($-95°$ C.). The reaction vessel is then turned on and the silane flow resumed and the sequence is repeated. When sufficient disilane is collected, it is transferred to a collection cylinder immersed in liquid nitrogen by removing the n-pentane/liquid nitrogen trap. Finally, a circulating pump is not required using this technique because a constant flow of SiH$_4$ at 50 sccm at 1 to 2 torr is maintained through the synthesis station.

A sample of disilane was collected ($\sim\frac{1}{2}$ atm in a 150 cc volume) and analyzed using a sampling quadrupole mass spectrometer. The crude analysis of the fraction was 81% disilane, 15% trisilane and 4% monosilane. Because a distillation through the −95° C. trap was not made, trisilane was present as an impurity. A direct quantitative measure of hydrogen could not be determined because of background interference in the mass spectrometer. The absence of hydrocarbons, chlorosilanes, and disiloxane at the 10-100 ppm levels was established by making mass scans with the mass spectrometer at a sensitivity increase of 10,000. If trisilane were removed by trapping, a 96% pure disilane product would be obtained and the major contaminant would be monosilane. With proper pumping on the pentane traps, the monosilane should be reduced to 1% or less.

I claim:

1. A method of forming a reaction product including disilane from monosilane comprising the steps of:
   flowing the monosilane gas into a reaction vessel at a rate such that the monosilane residence time in the reaction vessel is less than about one second;
   maintaining a glow discharge in the monosilane in the reaction vessel thereby converting a portion of the monosilane to disilane; and
   flowing the reaction product comprising the disilane out of the reaction vessel.

2. The method of claim 1 wherein the residence time is between about 0.05 and 0.50 second.

3. The method of claim 2 wherein the residence time is between about 0.1 and 0.3 second.

4. The method of claim 1 wherein the reaction vessel includes a first electrode and a second electrode axially disposed about the first electrode.

5. The method of claim 4 wherein the total gas pressure in the reaction vessel is between about 1 and 2 torr and the reaction vessel is held at temperature between about 120° C. and 300° C.

6. The method of claim 4 wherein the gas residence time in the reaction vessel is between about 0.05 and 0.50 second.

7. The method of claim 6 wherein the gas residence time is between 0.10 and 0.30 second.

8. The method of claim 1 wherein the reaction vessel comprises a chamber having a dielectric wall with a coil axially disposed about the wall.

9. The method of claim 1 further comprising the steps of:
   flowing the reaction product into a deposition chamber having a substrate therein; and
   maintaining a glow discharge in the reaction product in the deposition chamber sufficient to deposit a layer containing silicon onto a surface of the substrate.

10. An apparatus for producing a reaction product including disilane from monosilane comprising:
    a source of flowing monosilane gas;
    a reaction vessel;
    means for controlling the monosilane gas flow rate from the source into the vessel such that the gas residence time in the vessel is less than about one second;
    electrical means for maintaining a glow discharge in the monosilane gas in the reaction vessel; and
    output means for flowing the reaction product from said vessel.

11. The apparatus of claim 10 wherein the electrical means include a first electrode and a second electrode axially disposed about the first electrode in the reaction vessel.

12. The apparatus of claim 10 wherein the gas residence time is between about 0.05 and 0.5 seconds.

13. The apparatus of claim 12 wherein the gas residence time is between about 0.1 and 0.3 seconds.

14. The apparatus of claim 10 further comprising
    connecting means for connecting said output means to a deposition chamber to flow said reaction product into said deposition chamber; and
    deposition electrical means for maintaining a glow discharge in said reaction product in said deposition chamber.

* * * * *

UNITED STATES PATENT AND TRADEMARK OFFICE
CERTIFICATE OF CORRECTION

PATENT NO. : 4,568,437
DATED : February 4, 1986
INVENTOR(S) : Charles R. Dickson, Jr.

It is certified that error appears in the above-identified patent and that said Letters Patent is hereby corrected as shown below:

In the Abstract:

Line 2: after "vessel" insert --at a rate such that the monosilane gas resonance time in the reaction vessel is less than about one second--.

Lines 5 - 7: delete "at a rate such that the monosilane gas resonance time in the reaction vessel is less than about one second."

Signed and Sealed this

Twenty-second Day of April 1986

[SEAL]

Attest:

DONALD J. QUIGG

Attesting Officer

Commissioner of Patents and Trademarks